(12) United States Patent
Frank

(10) Patent No.: US 7,142,109 B1
(45) Date of Patent: Nov. 28, 2006

(54) CONTAINER VERIFICATION SYSTEM FOR NON-INVASIVE DETECTION OF CONTENTS

(75) Inventor: David L. Frank, Boca Raton, FL (US)

(73) Assignee: Innovative American Technology, Inc., Boca Raton, FL (US)

( * ) Notice: Subject to any disclaimer, the term of this patent is extended or adjusted under 35 U.S.C. 154(b) by 0 days.

(21) Appl. No.: 11/363,594

(22) Filed: Feb. 27, 2006

Related U.S. Application Data

(63) Continuation-in-part of application No. 11/291,574, filed on Dec. 1, 2005, which is a continuation-in-part of application No. 10/280,255, filed on Oct. 25, 2002, now Pat. No. 7,005,982.

(60) Provisional application No. 60/759,375, filed on Jan. 17, 2006, provisional application No. 60/759,373, filed on Jan. 17, 2006, provisional application No. 60/759,332, filed on Jan. 17, 2006, provisional application No. 60/759,331, filed on Jan. 17, 2006, provisional application No. 60/655,245, filed on Feb. 23, 2005, provisional application No. 60/631,865, filed on Dec. 1, 2004, provisional application No. 60/347,997, filed on Oct. 26, 2001.

(51) Int. Cl.
*G08B 1/08* (2006.01)

(52) U.S. Cl. ............. 340/539.26; 340/600; 250/363.04

(58) Field of Classification Search ........... 340/539.26, 340/539.29, 600, 539.1, 3.1, 506; 250/363.04; 378/57

See application file for complete search history.

(56) References Cited

U.S. PATENT DOCUMENTS

| | | | |
|---|---|---|---|
| 6,891,470 B1 * | 5/2005 | Bohinc, Jr. | 340/539.26 |
| 6,937,692 B1 * | 8/2005 | Johnson et al. | 378/57 |
| 7,030,755 B1 * | 4/2006 | Bohinc, Jr. | 340/539.26 |
| 2004/0119591 A1 * | 6/2004 | Peeters | 340/539.26 |
| 2005/0156734 A1 * | 7/2005 | Zerwekh et al. | 340/539.1 |

* cited by examiner

*Primary Examiner*—Phung T. Nguyen
(74) *Attorney, Agent, or Firm*—Jose Gutman; Fleit, Kain, Gibbons, Gutman, Bongini & Bianco P.L.

(57) ABSTRACT

A radiation, explosives, and special materials, detection and identification system includes a housing supporting one or more gamma sensors and one or more solid-state neutron sensors proximate to container contents under examination. The system collects radiation data from the sensors and compares the collected data to one or more stored spectral images representing one or more isotopes to identify one or more isotopes present. The identified one or more isotopes present are corresponded to possible materials or goods that they represent. The possible materials or goods are compared with the manifest relating to the container to confirm the identity of materials or goods contained in the container or to detect and/or identify unauthorized materials or goods in the container. A battery powered sensor arrangement is also disclosed.

24 Claims, 7 Drawing Sheets

RTIS Spreader Arm — Sensor Rail
Sensor and Shock Mount

RTIS Spreader Arm — Sensor Rail Sensor and Shock Mount

CONTAINER VERIFICATION SYSTEM FOR NON-INVASIVE DETECTION OF CONTENTS

CROSS-REFERENCE TO RELATED APPLICATIONS

This application is based on, and claims priority from, prior co-pending U.S. Provisional Patent Application No. 60/759,332, filed on Jan. 17, 2006, by inventor David L. FRANK, and entitled "Sensor Interface Unit And Method For Automated Support Functions For CBRNE Sensors"; and further is based on, and claims priority from, prior co-pending U.S. Provisional Patent Application No. 60/759,331, filed on Jan. 17, 2006, by inventor David L. FRANK, and entitled "Method For Determination Of Constituents Present From Radiation Spectra And, If Available, Neutron And Alpha Occurrences"; and further is based on, and claims priority from, prior co-pending U.S. Provisional Patent Application No. 60/759,373, filed on Jan. 17, 2006, by inventor David L. FRANK, and entitled "Distributed Sensor Network with Common Platform for CBRNE Devices; and further is based on, and claims priority from, prior co-pending U.S. Provisional Patent Application No. 60/759,375, filed on Jan. 17, 2006, by inventor David L. FRANK, and entitled Advanced Container Verification System; and furthermore is a continuation-in-part of, and claims priority from, prior co-pending U.S. patent application Ser. No. 11/291,574, filed on Dec. 1, 2005, which is a continuation-in-part of, and claims priority from, prior U.S. patent application Ser. No. 10/280,255, filed on Oct. 25, 2002 now U.S. Pat. No. 7,005,982, that was based on prior U.S. Provisional Patent Application No. 60/347,997, filed on Oct. 26, 2001, now expired, and which further is based on, and claims priority from, prior U.S. Provisional Patent Application No. 60/631,865, filed on Dec. 1, 2004, now expired, and which furthermore is based on, and claims priority from, prior U.S. Provisional Patent Application No. 60/655,245, filed on Feb. 23, 2005, now expired; the collective entire disclosure of which being herein incorporated by reference.

BACKGROUND OF THE INVENTION

1. Field of the Invention

This invention relates in general to shipping container contents detection systems, and more particularly to a non-invasive system and method to detect and identify hazardous materials within containers, such as radiation and/or neutron emitting materials, explosives, and special materials such as highly enriched uranium, and further to identify the normally occurring radiological materials within containers. Such a noninvasive container contents detection and verification system operates without having to enter the cavity of a container under examination. The system can include a radiation sensor system that uses integrated sensors for Gamma and neutron detection, and with a spectral analysis capability to identify the specific isotope(s) of materials in containers. Such a system can also include detection and identification of explosives and special materials in containers. These special materials may include highly enriched uranium.

2. Description of Related Art

Current attempts at providing radiation, neutron, explosives, and special materials, detection systems to verify shipping containers, such as those that have been mounted on the gantry crane arms, have resulted in detection systems that have limited sensitivity and efficiency and can not withstand the harsh environment. Radiation detection systems for detecting radiation from shipping containers have not had the ability to identify the specific isotopes. The inability to identify the specific isotopes present in the containers has not allowed these systems to further identify the goods or materials within the containers and therefore has restricted their ability to reliably evaluate the validity of the contents. Moreover, it has not allowed for a use of the manifest for verification of the container contents which has resulted in substantial false alarm rates and has impacted the flow of commerce. Further, these conventional implementations can be difficult to overcome analog noise caused by analog cabling systems. Furthermore, large shock factors of up to 200 G-forces per minute during normal operations handling large containers can cause failure and unreliable operation to key components of conventional radiation detection systems. These characteristics of current shipping container detection systems, such as for use with gantry cranes, detrimentally affect the commercial viability of radiation, neutron, explosives, and special materials, detection systems, cause substantial negative impacts to the flow of commerce, and particularly reduce their effectiveness and reliability in rugged-use environments.

In addition, technologies used to detect explosives can not penetrate metal or include methods that are dangerous to humans such as active x-ray or gamma imaging leaving no effective means to detect or identify explosives hidden in shipping containers.

Therefore a need exists to overcome the problems with the prior art as discussed above.

SUMMARY OF THE INVENTION

According to an embodiment of the present invention, a detection system and method detects gamma and neutron radiation with more effective methods that effectively eliminate vibration issues, noise gathered by analog cabling, and shock factors, such as encountered in harsh operating environments. The gamma detectors provide high-resolution data from 1 kev to 3 Mev to enable spectral analysis. Furthermore, an embodiment of the present invention provides radiation detector support functions such as automated calibration, automated gain control, and automated calibration verification to enable highly accurate calibration of a sensor or sensor array. The present invention, according to an embodiment, allows easy integration of commercial off-the-shelf or proprietary radiation sensors into a non-invasive container verification system. Additionally, an embodiment of the present invention includes rapid and highly accurate spectral analysis software to interrogate radiation data acquired from radiation sensors, and to identify the specific one or more isotopes and their ratio.

In order to verify whether radioactive materials are concealed within a shipping container, isotope sensing and identification systems can be deployed in association with a container, such as with a crane assembly used to lift shipping and transfer containers. Typically, the container crane includes a hoist-attachment which engages the shipping container. An isotope sensing and identification system would consist of one or more gamma and neutron detectors that are mounted on the crane hoist-attachment (or on the spreader arm) and provide detailed radiation spectral data to a computer performing spectral analysis for the detection and identification of isotope(s) that are present in the containers. Many normally occurring radiological materials exist in common goods and cause radiation detection systems to produce false alarms. By identifying the specific isotope(s) that are present allows the system to also identify the types of goods or materials that the isotopes represent. With a list of potential goods that represent the identified isotopes, the system can perform a comparison between the identified goods or materials and the shipping container manifest to determine if the radiological material(s) present match the expected materials within the container. The process of 1) identifying the isotope(s) that are within a container, 2) identifying the goods or materials that the isotopes represent and 3) verifying the contents of the manifest against the identified goods, allows the efficient verification of the container without negative impact to the flow of commerce Also, an embodiment of the present invention benefits from gamma sensors that are integrated with analog circuits and digital converters to eliminate the analog cabling and greatly reduce the analog portion of the system design thereby reducing background noise in the system design. The introduction of solid-state neutron sensors that are not affected by vibration or system shock and have integrated analog to digital converters greatly reduces the background noise during the system operation. This results in more reliable detection and sensing of radiation from within containers during normal shipping and handling operations of the containers.

In one embodiment, a Sensor Interface Unit (SIU) provides an open interface for radiation detectors based on an analog sensor interface module contained on an interchangeable daughter board. The analog section is responsible for amplifying and shaping the detector output, and converting the analog pulses to a digital signal. The digital section reads the digital signal, detects the peaks of the incoming pulses, and sends the peak data over a communications path to a processor that performs spectral analysis.

According to an embodiment, the gamma sensors are incorporated in the hoist-attachment (e.g., such as at the spreader bar), or the gamma sensors are mounted in a housing (e.g., a metal tube) designed to be strong and rugged to work in connection with the crane arm (or spreader bar) environment yet have a bottom surface (or surface facing the containers under examination) that provides minimum impact on the gamma particles passing through the housing to maintain sensitivity of the gamma sensors. This can be accomplished through the use of specialized materials or machining of the housing surface in proximity to the containers under examination, such as the bottom metal surface of the sensor tube at each sensor location.

According to an embodiment, neutron sensors are incorporated in the spreader bar of the crane assembly. Alternatively, the neutron sensors can be mounted in a housing, such as a metal box, that is designed to be strong and rugged such as to work in connection with the crane arm assembly and/or spreader bar, yet have minimum impact on the neutron particles passing through the housing to maintain sensitivity of the neutron sensors. A neutron moderator may be deployed within the housing to assist in detection of thermal neutrons.

Additional shock absorber methods provided by crane manufacturers further reducing the shock and vibrations on the spreader bar of the crane assembly and ultimately on the gamma sensors and neutron sensors.

According to another embodiment, the gamma radiation sensors are comprised of ambient temperature detectors with high resolution and a gamma range of 1 kev to 3 Mev. One such sensor combination would be through the deployment of sodium iodide sensors to enable a range up to 3 Mev with good resolution from 662 kev to 3 Mev and adding cadmium zinc telluride (CZT) sensors to enable high resolution between 1 kev and 662 kev. The combination of these two sensors types or other sensors types enables high resolution and provides coverage to identify a full range of radiation isotopes.

According to another embodiment, one or more battery powered neutron sensors and/or battery powered gamma sensors are deployed within the shipping container.

According to another embodiment, the radiation sensors are connected to a processor system that collects and analyzes the gamma energy levels and spectral data detected and then sends this data to a spectral analysis engine. Data from each detector is individually addressed and sent to the spectral analysis engine to allow for analysis of individual detector data or detector group data.

The processor system and a data collection system is electrically coupled with each sensor device within the crane arm (or spreader bar) sensor system, to collect signals from the array of neutron sensor devices to form histograms with the collected spectral data. The histograms are used by the spectral analysis system to identify the isotopes that are present.

The spectral analysis system, according to an embodiment, includes an information processing system and software that analyzes the data collected and identifies the isotopes that are present. The spectral analysis software consists of various filtering techniques for removal of background noise, interfering signals, such as backscatter radiation, and more that one method to provide multi-confirmation of the isotopes identified. Should more than one isotope be present, the system identifies the ratio of each isotope present. Examples of methods that can be used for spectral analysis such as in the spectral analysis software according to an embodiment of a container verification system, include: 1) a method and system for improving pattern recognition system performance as described in U.S. Pat. No. 6,847,731; and 2) a LINSCAN method (a linear analysis of spectra method) as described in U.S. Provisional Patent Application No. 60/759,331, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference.

A user interface of the information processing system, according to an embodiment, provides a graphic view of the radiation spectra detected and the isotopes identified. The user interface allows a user of the system to view, among other things, the individual detectors, detector groups, individual sensors, and sensor groups, to quickly identify maintenance conditions, radiation detected, and isotopes identified.

Another embodiment of the present invention provides for material detection using radio frequencies that are driven into the shipping container by means of the raw metal contacts that exist between the container and the crane arm (or spreader bar) during operation of the crane assembly. The use of radio frequency for material detection such as Nuclear Quadrupole Resonance (NQR) is a recognized technology for the detection and identification of explosives and other materials. Such a method could be used on the crane assembly (e.g., on the spreader bar) to pulse RF energy into the cavity of the container under examination and use the container as a medium to collect returning signals for analysis, detection, and identification of contents of the container. A key aspect of this embodiment is to take advantage of electrical connections (metal-to-metal contacts) between the crane arm (or spreader bar) and the container to enable, in a non-invasive manner, RF analysis and detection of explosives and other materials contained within the container under examination. This method overcomes the inability of RF signals to penetrate sealed metal objects, such as a shipping container, and to analyze the container contents for dangerous or hazardous materials using a method that is safe when used in an area with human contact.

In one embodiment of this invention, a sensor interface unit is used to allow for the integration of commercial off-the-shelf sensors, and also proprietary sensors, into a non-invasive container verification system.

DETAILED DESCRIPTION

Figure 1:
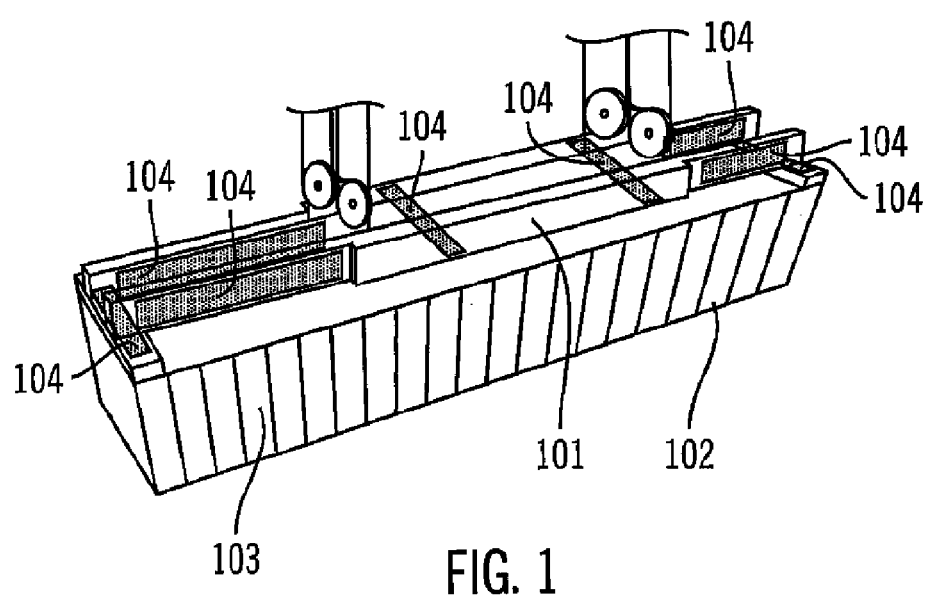
FIG. 1 is a picture depicting a container in proximity to a crane arm assembly (or a spreader bar) with sensors in sensor housings, in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "computer program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such as RAM, buffers, cache memory, and network circuits are contemplated to serve as such data storage means according to different embodiments of the present invention.

The present invention, according to an embodiment, overcomes problems with the prior art by providing high resolution gamma sensors with integrated analog to digital converters to reduce noise and shock factor and by providing solid-state neutron sensors that are rugged and not affected by vibration or shock factor. In addition, by mounting these radiation detection devices in a shock absorbing housing which is also shock mounted onto a spreader bar of a crane assembly enables a rugged design that can withstand shock forces up to a 200 G-force every minute for an extended period of time. The radiation sensor data collected enables detection and identification of the specific isotopes that are present in a container under examination.

An embodiment of the invention includes gamma and neutron sensors that provide significantly improved isotope detection and identification efficiency and sensitivity, especially for use in a harsh environment such as mounted on a spreader bar of a crane arm assembly. The detectors are connected to a Sensor Interface Unit (SIU) that provides the calibration, automated gain control, calibration verification, remote diagnostics, signal processing and communications to the processor for spectral analysis of the sensor data. The SIU is described in U.S. Provisional Patent Application No. 60/759,332, filed on Jan. 17, 2006, by inventor David L. FRANK, and entitled "Sensor Interface Unit And Method For Automated Support Functions For CBRNE Sensors", which is herein incorporated by reference. The neutron sensor devices are solid state and address the deficiencies of conventional neutron sensor devices especially when deployed in an aggressive and harsh operating environment such as on a spreader bar of a crane arm assembly.

According to an embodiment of the present invention, a crane arm assembly (or spreader bar) mounted sensor system may comprise a node within an Integrated Chemical, Biological, Radiation, Nuclear and Explosives (CBRNE) distributed architecture system. An example of such a system is described in U.S. Patent Application No. 60/759,373, Filed on Jan. 17, 2006, and entitled "Distributed Sensor Network With Common Platform For CBRNE Devices", the entire teachings of which being incorporated by reference.

According to an embodiment of the present invention, a crane arm (spreader bar) mounted radiation sensor system is comprised of one or more gamma and neutron sensor devices shock mounted to protect against shock forces up to 200 G-forces per minute for an extended period of time. One such method is a spring-mass-damper that can be used to suppress the effects of shock. The sensor device is assumed to be infinitely rigid, and the shock pulse is transferred directly into the spring mass damper. Examples of such shock absorbing systems are found in FIGS. 3 and 4, which will be more fully discussed below.

The sensors may also be shielded from electro-magnetic-interference (EMI). A data collection system, electrically coupled with each sensor device, collects signals from the sensor devices. The collected signals represent whether each sensor device has detected gamma or neutron radiation. Optionally, a remote monitoring system is communicatively coupled with the data collection system to remotely monitor the collected signals from the sensor devices and thereby remotely determine whether one or more gamma neutron sensor devices from the array have provided gamma data or neutron radiation data, and a spectral analysis system identifies the specific isotopes detected by the sensors, as will be more fully discussed below. A user interface provides sensor related data, such as a graphic presentation of the data from each sensor and group of sensors, the detection of radiation, and the identification of the one or more isotopes detected by the sensors.

Described now is an exemplary radiation detection and identification system mounted on a spreader bar of a crane assembly and the operation of the same, according to exemplary embodiments of the present invention.

An exemplary radiation detection and identification system deployed on a crane arm (or spreader bar) 101, or on the outside 102 or within a container 103, such as illustrated in FIG. 1, provides significantly improved detection efficiency and sensitivity over past attempts to deploy radiation detection devices in connection with a crane assembly. FIG. 1 illustrates example installation positions for various sensor housings 104. The inventive features and advantages of exemplary embodiments of a radiation detection and identification system, such as deployed in connection with a crane assembly or other shipping container handling operation, will be discussed below. However, it is assumed that the reader has an understanding of radiation and sensor technologies. Examples of neutron detection semiconductor devices and technology are described in U.S. Pat. No. 6,545,281 to McGregor et al., filed on Jul. 6, 2001, and entitled "POCKED SURFACE NEUTRON DETECTOR", and additionally described in U.S. Pat. No. 6,479,826 to Klann et al., filed on Nov. 22, 2000, and entitled "COATED SEMICONDUCTOR FOR NEUTRON DETECTION", and in U.S. patent application Ser. No. 10/695,019, entitled "HIGH EFFICIENCY NEUTRON DETECTORS AND METHODS OF MAKING SAME" to McGregor et al., the entire collective teachings thereof being herein incorporated by reference.

Figure 2:
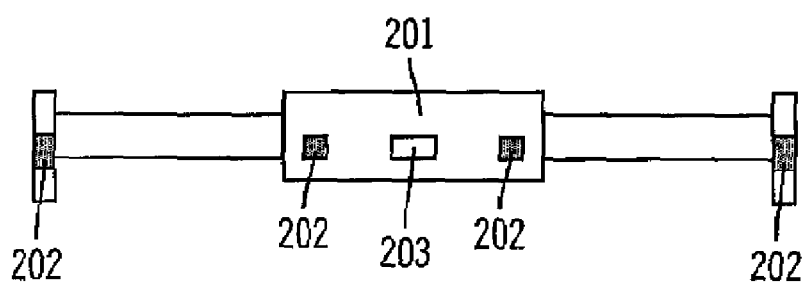
FIG. 2 is a simplified schematic view illustrating an exemplary placement of sensors and associated electronics on a crane arm assembly (or a spreader bar).

Referring to FIG. 2, an exemplary radiation detection and identification system is deployed on a crane arm assembly (or spreader bar) 201. The system includes one or more sensors 202, including gamma sensors and neutron sensors. The gamma sensors 202 provide high resolution detection across a 1 kev to 3 Mev range. The one or more neutron sensors 202 comprise solid state devices. The sensors 202 are communicatively coupled with a data collection and communications system 203. The mounting of the sensors 202 on the crane arm assembly 201 will be discussed in more detail below.

Figure 3:
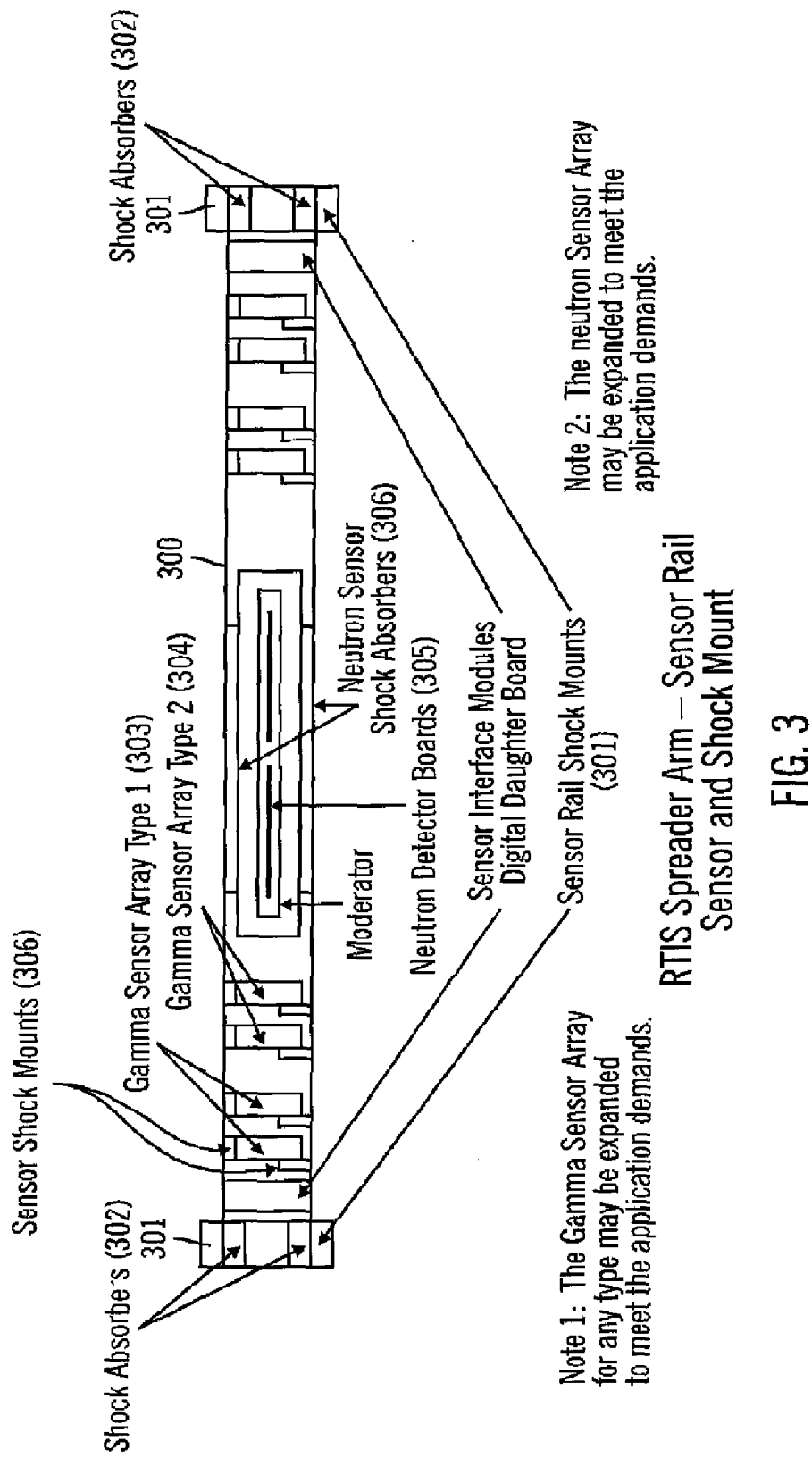
FIG. 3 is a simplified schematic view illustrating an exemplary configuration of sensors in a sensor housing.

Referring to FIG. 3, an exemplary frame structure, illustrated as a housing 300, can be configured to support multiple types of gamma sensors 303, 304, and neutron sensors 305. The housing 300 is mounted on a crane arm assembly (or spreader bar) (not shown in FIG. 3). The housing 300 provides modular installation of a radiation sensor system as well as shock absorbing capabilities to address shock forces of up to 200 G-forces per minute for an extended period that can be experienced during operation of such crane arm assemblies while handling large containers. The housing 300, in this example, is electrically isolated from the crane arm assembly and further provides EMI shielding for any electronic circuits and other devices in the housing 300. Shock absorbing mountings 301, 302 for the housing 300 provide shock absorption between the housing 300 and the crane's spreader bar (not shown). The sensor shock mounts 306 are provided to further isolate the sensors 303, 304, 305, from shock forces experienced during operation of the crane's spreader bar (not shown). Within the housing 300 can be included other electronics and devices such as sensor interface modules, data collection electronics, and data communication electronics. Any of these circuits and/or modules can also be mounted in the housing 300, or in another separate housing (not shown), using shock absorbing mounts to help also isolate these from the shock forces experienced during operation of the crane's spreader bar (not shown). Additionally, besides shock absorption, these circuits and modules in the housing 301, according to the present example, benefit from electrical isolation from the crane arm assembly, and from EMI shielding by the housing 300.

Figure 4:
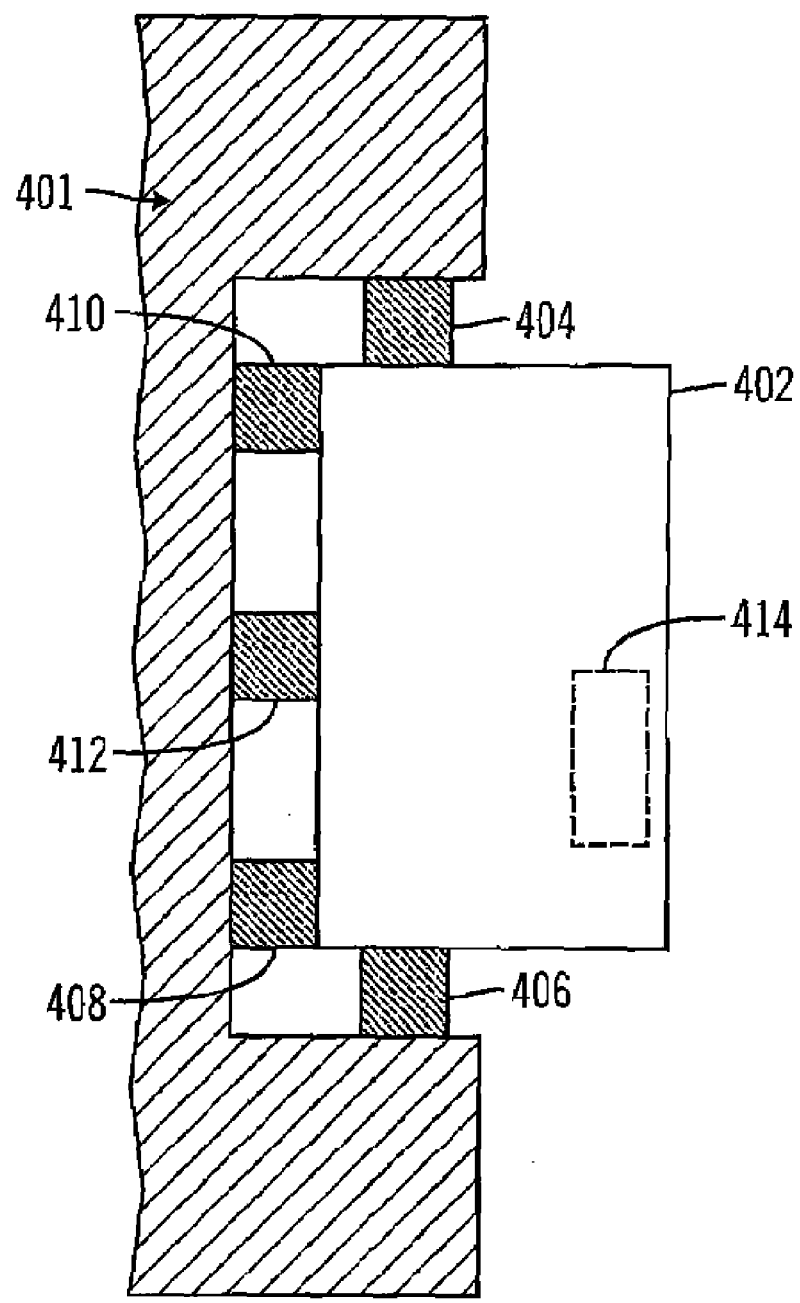
FIG. 4 is a side longitudinal cross-sectional view of a spreader bar of a crane arm assembly showing an exemplary configuration of a sensor housing mounted on the spreader bar, according to an embodiment of the present invention.

FIG. 4 illustrates another example of a mounting arrangement between a crane arm assembly (or spreader bar) 401 and a frame structure (e.g., a housing) 402. The frame structure 402 in this example comprises at least a partial housing that contains the sensors 414. The at least a partial housing 402 includes one or more housing walls attached to a frame structure 402. The one or more walls help to protect the sensors 414, and other electronics and devices, in the at least partial housing 402 from external environmental hazards. Areas that do not include a wall in the frame structure 402 can provide a more clear and direct path (without interference of another wall structure) between detection surfaces of the sensors 414 and a container under examination to enhance detection sensitivity of the sensors 414. A collection of shock mounts 404, 406, 408, 410, 412, provide shock absorption to help isolate the frame structure 402, and the sensors 414 and other electronics and modules in the at least partial housing 402, from the shock forces experienced during operation of the crane's spreader bar 401. The at least partial housing 402 is mounted on the spreader bar 401 in a recessed region, such as in a recessed region of an I-beam shape of the spreader bar 401. In this example, the sensors 414 are mounted in the frame structure 402 to extend the sensors 414 out of the recessed region of the I-beam of the bar 401. This mounting arrangement of the sensors 414 provides a more clear and direct path (without interference of another structure such as the spreader bar 401) between radiation detection surfaces of the sensors 414 and a container under examination (not shown in FIG. 4) being held by the crane arm assembly (or spreader bar) 401.

While the frame structure 402 has been discussed by example as comprising at least a partial housing supporting the one or more sensors 414, it should be understood by those of ordinary skill in the art in view of the present discussion that the term frame structure should be given a very broad meaning to include many different kinds of frame structures that can support one or more sensors 414 in accordance with alternative embodiments of the present invention. For example, a frame structure can include a frame with no housing walls. A frame structure can also include the structure of a crane arm assembly, such as the spreader bar itself, to provide support for the sensors 414. For example, the sensors 414, and even a digital data collection system 610 and a spectral analysis system 640

(shown in FIG. 6), can be integrated on the spreader bar of a gantry crane. The frame structure can also include a structure that is separate and independent from a crane arm assembly. For example, a frame structure can comprise a fork lift truck structure. Alternatively, a frame structure can comprise a stationary supporting structure that supports sensors 414 and that containers can be located in proximity to the sensors 414 for a container contents examination operation. In one embodiment, the frame structure is contemplated to include the frame structure of the container under examination. Such a frame structure can support one or more sensors 414 inside the container and/or outside the container, as will be discussed in more detail below.

Figure 5:
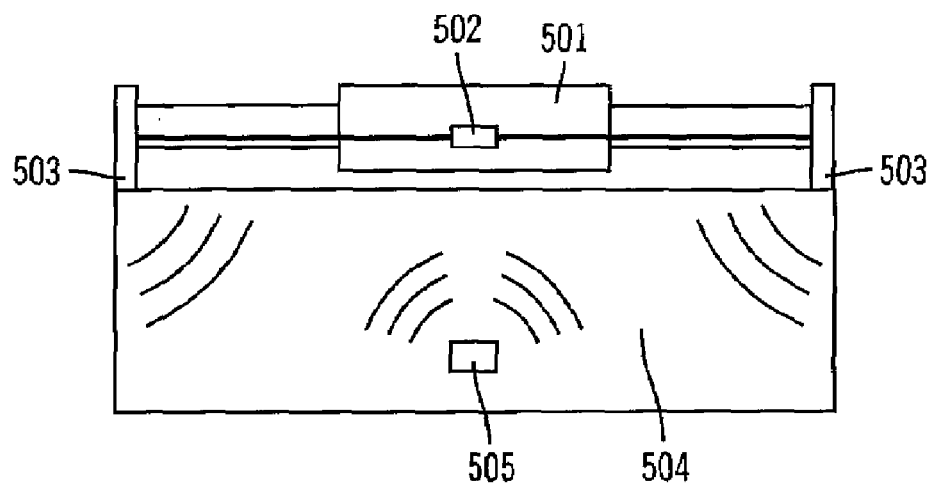
FIG. 5 is a simplified schematic view illustrating an exemplary RF detection system for detecting explosives and special materials in a container.

Referring now to FIG. 5, according to an embodiment of the present invention, a crane arm explosives and special material sensor system is comprised of one or more RF generators and receivers 502 generating signals that are pulsed into the cavity of the container through the raw electrical contacts 503 between the crane arm assembly (spreader bar) 501 and the container 504 under examination. The RF return signals (from the cavity of the container under examination) are received by the one or more receivers 502 through the container 504 and the electrical connection to the crane arm assembly (spreader bar) 501. The container and interconnecting structures collectively provide one or more RF antenna systems coupling the RF return signals to the RF receivers 502. The RF receivers 502 then deliver the RF return signals to a data collection and analysis system (such as the system shown in FIG. 6) for processing. The receivers 502, in this example, include processing circuits that convert received return signals (e.g., received analog signals) into data signals that are provided to the data collection and analysis system for further processing.

Figure 6:
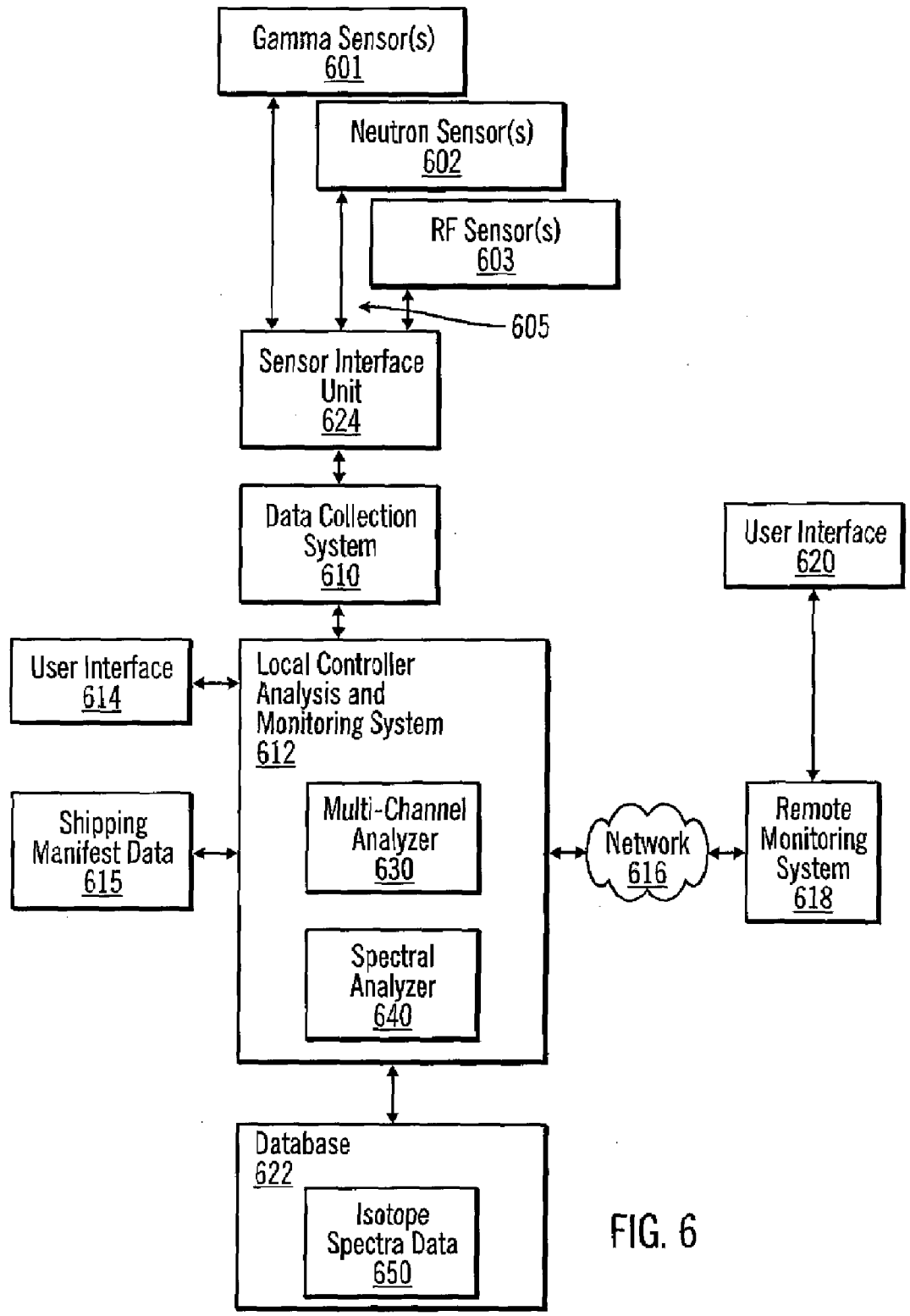
FIG. 6 is a block diagram illustrating an exemplary data collection and analysis system, in accordance with an embodiment of the present invention.

With reference to FIG. 6, a data collection system 610, in this example, is communicatively coupled via cabling, wireless communication link, and/or other communication link 605 with each of the gamma radiation sensor devices 601 and neutron sensor devices 602 in each sensor unit, and with each of the RF sensor device(s) 603 such as including the one or more receivers 502 shown in FIG. 5. Cabling preferably includes shielded analog cable to reduce background noise on the output signals from the one or more sensors 601, 602, 603. The data collection system 610 includes an information processing system with data communication interfaces 624 that collect signals from the radiation sensor units 601, 602, and from the RF sensor device(s) 603. The collected signals, in this example, represent detailed spectral data from each gamma sensor device that has detected radiation.

The data collection system 610 is modular in design and can be used specifically for radiation detection and identification, or for RF signal collection for explosives and special materials detection and identification, or can be combined to support both radiation detection and RF signal collection.

The data collection system 610 is communicatively coupled with a local controller and monitor system 612. The local system 612 comprises an information processing system that includes a computer, memory, storage, and a user interface 614 such a display on a monitor and a keyboard, or other user input/output device. In this example, the local system 612 also includes a multi-channel analyzer 630 and a spectral analyzer 640.

The multi-channel analyzer (MCA) 630 comprises a device composed of many single channel analyzers (SCA). The single channel analyzer interrogates analog signals received from the individual radiation detectors 601, 602, and determines whether the specific energy range of the received signal is equal to the range identified by the single channel. If the energy received is within the SCA the SCA counter is updated. Over time, the SCA counts are accumulated. At a specific time interval, a multi-channel analyzer 630 includes a number of SCA counts, which result in the creation of a histogram. The histogram represents the spectral image of the radiation that is present. The MCA 630, according to one example, uses analog to digital converters combined with computer memory that is equivalent to thousands of SCAs and counters and is dramatically more powerful and cheaper.

The histogram is used by the spectral analysis system 640 to identify isotopes that are present in materials contained in the container under examination. One of the functions performed by the information processing system 612 is spectral analysis, performed by the spectral analyzer 640, to identify the one or more isotopes, explosives or special materials contained in a container under examination. With respect to radiation detection, the spectral analyzer 640 compares one or more spectral images of the radiation present to known isotopes that are represented by one or more spectral images 650 stored in the isotope database 622. By capturing multiple variations of spectral data for each isotope there are numerous images that can be compared to one or more spectral images of the radiation present. The isotope database 622 holds the one or more spectral images 650 of each known isotope. These multiple spectral images represent various levels of acquisition of spectral radiation data of known isotopes so collected radiation data of isotopes to be identified can be compared and identified using various amounts of spectral data that may be available from the one or more sensors. Whether there are small amounts (or large amounts) of data acquired from the sensor, the spectral analysis system 640 compares the acquired radiation data from the sensor to one or more spectral images associated with each known isotope. In summary, the spectral analysis system analyzes the collected radiation data to identify one or more isotopes associated with the collected radiation data by comparing one or more spectral images of the collected radiation data to one or more spectral images stored in the isotope database 622, where each known isotope is associated with one or more spectral images stored in the isotope database 622. The stored one or more spectral images associated with a known isotope represent one or more levels of spectral radiation data that may be collected from the one or more sensors when detecting the known isotope.

This analysis by comparison to various spectral images associated with known isotopes significantly enhances the reliability and efficiency of matching acquired spectral image data from the sensor to spectral image data of each possible isotope to be identified. Once the one or more possible isotopes are determined present in the radiation detected by the sensor(s), the information processing system 612 can compare the isotope mix against possible materials, goods, and/or products, that may be present in the container under examination. Additionally, a manifest database 615 includes a detailed description of the contents of each container that is to be examined. The manifest 615 can be referred to by the information processing system 612 to determine whether the possible materials, goods, and/or products, contained in the container match the expected authorized materials, goods, and/or products, described in the manifest for the particular container under examination. This matching process, according to an embodiment of the present invention, is significantly more efficient and reliable than any container contents monitoring process in the past.

The spectral analysis system 640, according to an embodiment, includes an information processing system and software that analyzes the data collected and identifies the isotopes that are present. The spectral analysis software consists of more that one method to provide multi-confirmation of the isotopes identified. Should more than one isotope be present, the system identifies the ratio of each isotope present. Examples of methods that can be used for spectral analysis such as in the spectral analysis software according to an embodiment of a container contents verification system, include: 1) a method and system for improving pattern recognition system performance as described in U.S. Pat. No. 6,847,731; and 2) a LINSCAN method (a linear analysis of spectra method) as described in U.S. Provisional Patent Application No. 60/759,331, filed on Jan. 17, 2006, by inventor David L. Frank, and entitled "Method For Determination Of Constituents Present From Radiation Spectra And, If Available, Neutron And Alpha Occurrences"; the collective entire teachings of which being herein incorporated by reference.

With respect to analysis of collected data pertaining to explosives and/or special materials, the spectral analyzer 640 and the information processing system 612 compare identified possible explosives and/or special materials to the manifest 615 by converting the stored manifest data relating to the shipping container under examination to expected explosives and/or radiological materials and then by comparing the identified possible explosives and/or special materials with the expected explosives and/or radiological materials. If the system determines that there is no match to the manifest for the container then the identified possible explosives and/or special materials are unauthorized. The system can then provide information to system supervisory personnel to alert them to the alarm condition and to take appropriate action.

The user interface 614 allows service or supervisory personnel to operate the local system 612 and to monitor the status of radiation detection and identification of isotopes and/or the detection of RF signals by the collection of sensor units 601, 602 and 603 deployed on the frame structure, such as on the crane arm assembly (or spreader bar).

The user interface 614, for example, can present to a user a representation of the collected received returning signals, or the identified possible explosives and/or special materials in the shipping container under examination, or any system identified unauthorized explosives and/or special materials contained within the shipping container under examination, or any combination thereof.

The data collection system can also be communicatively coupled with a remote control and monitoring system 618 such as via a network 616. The remote system 618 comprises an information processing system that has a computer, memory, storage, and a user interface 620 such as a display on a monitor and a keyboard, or other user input/output device. The network 616 comprises any number of local area networks and/or wide area networks. It can include wired and/or wireless communication networks. This network communication technology is well known in the art. The user interface 620 allows remotely located service or supervisory personnel to operate the local system 612 and to monitor the status of shipping container verification by the collection of sensor units 601, 602 and 603 deployed on the frame structure, such as on the crane arm assembly (or spreader bar).

By operating the system remotely, such as from a central monitoring location, a larger number of sites can be safely monitored by a limited number of supervisory personnel. Besides monitoring container handling operations such as from crane arm assemblies, as illustrated in the example of FIG. 1, it should be clear that many different applications can benefit from the shipping container verification function to detect and identify radiation, explosives and special materials. For example, fork lift truck mounted sensor units communicating with a remote monitoring system allow radiation detection and identification where large amounts of cargo are moved and handled, such as at ports, railway, and intermodal stations, and at ships, airplanes, trucks, warehouses, and other carrier environments, and at such other places that have large amounts of cargo to handle as should be understood by those of ordinary skill in the art in view of the present discussion. Note that the sensors 414 can be mounted on many different types of frame structures and related environments. This monitoring capability, both local and remote monitoring, and at a significantly reduced cost of deploying and running such a monitoring system, provides a significant commercial advantage.

Additionally, the system monitoring function can be combined to monitor more than radiation and explosives. Other types of hazardous elements can be monitored in combination with the radiation detection by combining appropriate sensors and detectors for these other types of hazardous elements with the radiation and RF sensor units and monitoring system according to alternative embodiments of the present invention.

Figure 7:
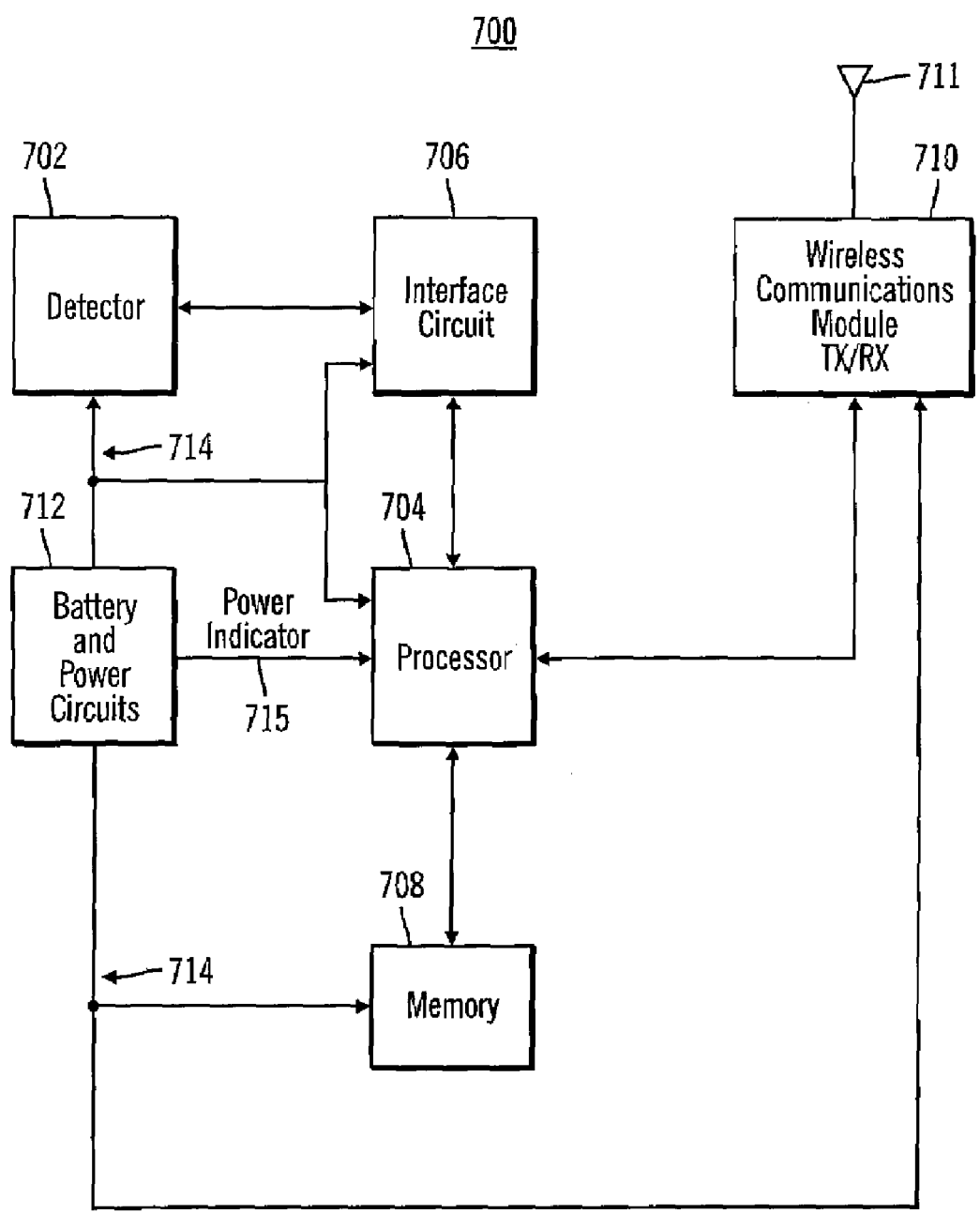
FIG. 7 is a block diagram illustrating an exemplary battery operated detector.

Referring to FIG. 7, it should be understood that sensor devices such as gamma sensors 202 and neutron sensors 202 as shown in FIG. 2 can be deployed as battery powered devices 700. Power consumption requirements of such sensor devices 700 can be supplied for long periods of time by modern battery technologies and power conservation techniques. This allows mounting these sensors 700 in many different mounting arrangements relative to different types of frame structures, and without needing to be tethered to a continuous power source. The detector 702, according to an example illustrated in FIG. 7, can include one or more gamma detectors, neutron detectors, or a combination thereof. The processor 704 communicates with the detector 702 via interface circuitry 706. The processor 704 stores data signals collected from the detector 702 into memory 708. The memory 708 also stores configuration parameters and other program and data used by the processor 704 to perform its functions as a controller-processor 704 for the battery powered sensor device 700. One such function is the communication of the collected data from the detector 702 to a data collection system 610 (such as shown in FIG. 6). The communication function, in this example, is handled via wireless communication such as using RF communication via a wireless communication module 710 and an RF antenna 711. One form of wireless communication is on wireless networks using ad-hoc communication mode where wireless devices, such as a collection of battery powered sensors 700 deployed on various frame structures, directly communicate with each other (in a peer-to-peer communication fashion) to dynamically establish a network of neighboring wireless devices. Operating in ad-hoc mode allows all wireless devices within range of each other to discover and communicate in peer-to-peer fashion without involving central access points. In one example, every neighboring wireless device in such a network will communicate its collected radiation data with the other neighboring devices that then store all the collected radiation data from all neighboring sensor devices 700 in memory 708. In this way, when a data collection system 610 communicates with one of the sensor devices 700 it can interrogate and receive collected data from all neighboring sensor devices 700. This is particularly useful where the sensor devices 700 are deployed on various frame structures that include one or more containers, which are commonly stacked in a container-handling environment. This allows, for example, examination of containers located near the center of a stack which otherwise would be very difficult or impossible to examine without first removing the container from the stack. This allows a shipping port operation, for example, to handle containers very efficiently while monitoring for possible unauthorized contents in any of the containers. Also, as another example, a monitoring ship carrying the data collection system 610 and the analysis and monitoring system 612, could ride along a container cargo ship and the data collection system 610 would interrogate the one or more sensors 700 mounted to one or more frame structures in the container cargo ship. The data collection system 610, by communicating with one of the sensors 700, would be able to receive the data collected from all of the sensors 700 in the ad hoc network.

The battery and power conditioning circuits 712 provide power (such as via at least one power bus 714) to all of the electronics, modules, and devices in the sensor 700. Additionally, the power circuits 712 provide a power indicator signal 715 to the processor 704. This allows the processor 704 to monitor when power is good and when power is getting too low. In the latter condition, the processor 704 can send an alarm condition via the wireless communication module 710 to the data collection system 610 and to the information processing system 612. This allows the system to take appropriate corrective action. For example, the identification of the particular sensor 700 with the low power alarm can prompt service personnel to replace the battery (or to re-charge the battery) at the sensor 700 as soon as possible. Also, the system 712 can disregard detection and sensing signals from such a device 700 that has sent an alarm indicating an unreliable power condition. This will help avoid false sensing, or failed sensing, conditions by sensors 700 that have unreliable power.

The battery operated sensor devices 700, such as including gamma and/or neutron sensors, can be mounted in any position on a container (one type of frame structure). For example, one or more devices 700 can be mounted to one or more inner surfaces of a container. A suggested position, according to one embodiment, is at an inner surface of the center of the roof/ceiling of the container to allow equal access to monitor all goods and materials in the container. As can be appreciated by those of ordinary skill in the art in view of the present discussion, multiple sensors 700 may be used and the sensors 700 can be mounted in any position within the container, on the outside of the container, or any combination thereof.

The sensor devices 700, according to an embodiment, are deployed on the outside of containers, embedded in (or mounted to) the stacking interlocking mechanisms that are commonly found in most standard shipping containers. These interlocking mechanisms are normally found at the corners of a container. There are about 16 million containers worldwide and the stacking interlocking mechanisms are commonly in use across the world. By embedding (or mounting) a sensor device 700 in the metal structure of a stacking interlocking mechanism, such as by mounting a sensor device 700 in a cavity in each twist lock of the stacking interlocking mechanism of each container, the one or more sensors 700 could be more efficiently used to monitor the contents of containers. The use of these sensor devices 700 in every interlocking mechanism of each container and communicating with each other in an Ad-Hoc network would allow a US Customs vessel to come alongside a cargo ship, initiate communications with any of the wireless communications modules 710, to determine if there is a radiation detection at a particular container, even one that is stored deep in a stack of containers inside the cargo ship hull. This is a significant advantage of an embodiment of the present invention that has not been available in the past.

A reference source of radiation can be found in proximity to one or more of the detectors 702 in a sensor 700 (also see sensors 202 shown in FIG. 2) to facilitate real-time calibration of the detectors 702 through communication with the multi-channel analyzer 630.

Radiation detectors 702 are known to have analog drift over time. The spectral analysis system 640 typically relies on accurate spectral data (within calibration) from the sensors 700 to identify the specific isotopes that are present in the container under examination. To provide accurate data over time, a minute radiological source can be exposed to the radiation detector 702 during calibration checks. The radiation source (such as a trace level of a radiological material) can be a continuous exposure source at the detector 702, an intermittent (selective) exposure source (such as in a cup that can be opened or closed to selectively expose the source for calibration), or any combination of one or more sources at the detector 702 and/or at the sensor 700. A reference signal from detecting this reference source is analyzed by the multi-channel analyzer system 630 to ensure that the detector 702 is in calibration. If the detector 702 is out of calibration, the multi-channel analyzer system 630 modifies the received detector data from the particular sensor 700 to bring the detector data into calibration (sensor calibration) prior to placing the data into the histogram for spectral analysis by the spectral analysis system 640.

The preferred embodiments of the present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

An embodiment according to present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A radiation detection and identification system, comprising:
   a frame structure;
   one or more gamma sensors;
   one or more solid-state neutron sensors, wherein the one or more gamma sensors and the one or more solid-state neutron sensors being collectively mounted on the frame structure that can be located in proximity to a container under examination;
   a digital data collection system, communicatively coupled with the one or more gamma sensors and the one or more solid-state neutron sensors, for collecting radiation data from the one or more gamma sensors and the one or more solid-state neutron sensors;
   a multi-channel analyzer system, communicatively coupled with the digital data collection system, for preparing histograms of the collected radiation data;
   a spectral analysis system, communicatively coupled with the multi-channel analyzer system and the digital data collection system, for receiving and analyzing the collected radiation data and the histograms to detect radiation and to identify one or more isotopes associated with the collected radiation data;
   a first data storage means for storing data representing isotope spectra for use by the spectral analysis system, where one or more spectral images stored in the first data storage unit represent each isotope, the first data storage means being communicatively coupled with the spectral analysis system;
   an information processing system, communicatively coupled with the spectral analysis system, for analyzing the identified one or more isotopes and to determine the possible materials or goods that they represent; and
   a second data storage means for storing data representing a manifest relating to the container under examination, the second data storage means being communicatively coupled with the information processing system, the information processing system further for comparing the determined possible materials or goods with the manifest relating to the container under examination to determine if there are unauthorized materials or goods contained within the container under examination.

2. The system of claim 1, wherein:
   the one or more gamma sensors comprise:
      integrated analog interface and analog to digital converter,
      sensor resolution of 3.4% or better between 1 kev and 662 kev, and
      sensor resolution of 12% or better between 662 kev and 3 Mev; and
   the one or more solid-state neutron sensors comprise:
      integrated analog interface and analog to digital converter, and
      a moderator for thermal neutron detection.

3. The system of claim 1, wherein the frame structure is mounted on a separate supporting structure that comprises any of the following: a crane arm assembly, a spreader bar, a stationary support, a fork lift truck, a ship; a plane, a truck, a rail car, and any combination thereof.

4. The system of claim 1, wherein the frame structure is mounted on a separate supporting structure that is part of a fork lift truck.

5. The system of claim 1, wherein the frame structure is mounted on a separate supporting structure that comprises at least one of a railway, airport, and sea port, crane system.

6. The system of claim 1, further comprising:
   a shock absorbing system mechanically coupled with the frame structure for protecting the one or more gamma sensors and the one or more solid-state neutron sensors being mounted on the frame structure.

7. The system of claim 6, wherein the frame structure is mounted on a separate supporting structure, and wherein the shock absorbing system protecting the one or more gamma sensors and the one or more solid-state neutron sensors from shock forces of up to 200 G-forces present at the separate supporting structure every minute for an extended period of time.

8. The system of claim 1, wherein the frame structure comprises at least a partial housing around the one or more gamma sensors and the one or more solid-state neutron sensors.

9. The system of claim 8, wherein the at least a partial housing comprises one or more housing walls attached to the frame structure.

10. The system of claim 8, wherein the at least a partial housing comprises a complete enclosure around the one or more gamma sensors and the one or more solid-state neutron sensors.

11. The system of claim 1, further comprising:
    a shock absorbing system mechanically coupled with a spreader bar of a gantry crane; and
    a sensor housing containing the one or more gamma sensors and the one or more solid-state neutron sensors and being mounted on the spreader bar via the shock absorbing system to protect the one or more gamma sensors and the one or more solid-state neutron sensors from shock forces of up to 200 G-forces present at the spreader bar every minute for an extended period of time.

12. The system of claim 1, further comprising:
    a housing for containing the one or more gamma sensors, the housing being ruggedly constructed to withstand an environment at a spreader bar of a gantry crane, and the housing providing minimal reduction of gamma radiation passing through the housing to the surfaces of each of the one or more gamma sensors.

13. The system of claim 1, further comprising:
    a housing for containing the one or more gamma sensors, the housing being constructed of material comprising one or more strong metals to withstand a rugged environment at a spreader bar of a gantry crane, the housing having at least one housing wall that is milled to a thin layer at each position of the one or more gamma sensors to minimize gamma radiation shielding by the housing for sensing gamma radiation at any of the individual gamma sensor surfaces.

14. The system of claim 1, further comprising:
a housing for containing the one or more gamma sensors, the housing being constructed of metal comprising beryllium to withstand a rugged environment at a spreader bar of a gantry crane while minimizing shielding of gamma particles passing through the housing for sensing the gamma particles at any of the individual gamma sensor surfaces.

15. The system of claim 1, further comprising:
at least one shock absorption mounted detector including one or more analog gamma sensors with shielded analog cable to reduce background noise on the output signals from the one or more sensors and to reduce mechanical shock impact on the one or more sensors.

16. The system of claim 1, further comprising:
a wireless or wire-line communications system to transport the radiation data collected by the one or more gamma sensors and the one or more solid-state neutron sensors to the spectral analysis system.

17. The system of claim 1, wherein the sensors, the digital data collection system, and the spectral analysis system, are integrated on a spreader bar of a gantry crane.

18. The system of claim 1, wherein the one or more gamma sensors include respective one or more gamma detectors, and wherein the one or more gamma detectors are either continuously exposed or selectively exposed to a trace level of a radiological material to provide a reference signal associated with one or more gamma sensors for sensor calibration of the one or more gamma sensors.

19. The system of claim 18, wherein the multi-channel analyzer system uses the reference signal associated with the one or more gamma sensors to adjust the collected radiation data from the one or more gamma sensors to obtain proper calibration of the collected radiation data.

20. The system of claim 1, wherein the spectral analysis system analyzes the collected radiation data to identify one or more isotopes associated with the collected radiation data by:
comparing one or more spectral images of the collected radiation data to one or more spectral images stored in the first data storage means, each known isotope being associated with one or more spectral images stored in the first data storage means, and wherein the stored one or more spectral images associated with a known isotope represent one or more levels of spectral radiation data that may be collected from the one or more sensors when detecting the known isotope.

21. An explosives and special material detection and identification system, comprising:
one or more RF signal generators, mounted on a spreader bar of a gantry crane, that transmit RF signals through electrical contacts between the spreader bar and a shipping container under examination and then into a cavity of the shipping container under examination;
one or more RF receivers for coupling to one or more RF antenna systems for receiving returning signals from within the cavity of the shipping container under examination, the one or more RF antenna systems receiving returning signals from within the cavity of the shipping container under examination through electrical contacts between the shipping container under examination and the spreader bar;
a data collection system, communicatively coupled to the one or more RF receivers, for collecting received returning signals from the one or more RF receivers;
a spectral analysis and information processing system, communicatively coupled with the data collection system, to analyze the collected received returning signals for detecting materials in the cavity of the shipping container under examination, and to identify the possible explosives and/or special materials therein; and
a data storage means for storing data representing a manifest relating to the shipping container under examination, the data storage means being communicatively coupled with the spectral analysis and information processing system, the spectral analysis and information processing system further for comparing the identified possible explosives and/or special materials with the manifest relating to the shipping container under examination to determine if there are unauthorized explosives and/or special materials contained within the shipping container under examination.

22. The system of claim 21, further comprising:
a user interface, communicatively coupled with the spectral analysis and information processing system, to present to a user at least one of
a representation of the collected received returning signals,
the identified possible explosives and/or special materials in the shipping container under examination, and
the system identified unauthorized explosives and/or special materials contained within the shipping container under examination.

23. The system of claim 21, wherein the special materials include highly enriched uranium.

24. The system of claim 21, wherein the spectral analysis and information processing system compares the identified possible explosives and/or special materials to the manifest by converting the manifest relating to the shipping container under examination to expected explosives and/or radiological materials and then comparing the identified possible explosives and/or special materials with the expected explosives and/or radiological materials.

* * * * *